United States Patent
Kumazaki

(10) Patent No.: US 12,304,525 B2
(45) Date of Patent: May 20, 2025

(54) VEHICLE CONTROL DEVICE, STORAGE MEDIUM FOR STORING COMPUTER PROGRAM FOR VEHICLE CONTROL, AND METHOD FOR CONTROLLING VEHICLE

(71) Applicant: TOYOTA JIDOSHA KABUSHIKI KAISHA, Toyota (JP)

(72) Inventor: Kenta Kumazaki, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 236 days.

(21) Appl. No.: 18/165,697

(22) Filed: Feb. 7, 2023

(65) Prior Publication Data

US 2023/0322258 A1 Oct. 12, 2023

(30) Foreign Application Priority Data

Apr. 6, 2022 (JP) ................. 2022-063524

(51) Int. Cl.
*B60W 60/00* (2020.01)
*B60W 50/10* (2012.01)

(52) U.S. Cl.
CPC .......... *B60W 60/001* (2020.02); *B60W 50/10* (2013.01); *B60W 2554/4041* (2020.02); *B60W 2554/801* (2020.02)

(58) Field of Classification Search
CPC ............... B60W 60/001; B60W 50/10; B60W 2554/4041; B60W 2554/801; B60W 30/12; B60W 2754/20
See application file for complete search history.

(56) References Cited

U.S. PATENT DOCUMENTS

| | | | |
|---|---|---|---|
| 2016/0347328 A1 | 12/2016 | Takehara et al. | |
| 2017/0137033 A1 | 5/2017 | Habu | |
| 2018/0141588 A1 | 5/2018 | Shimizu | |
| 2023/0286583 A1* | 9/2023 | Uemura | ............ B62D 15/0255 |

FOREIGN PATENT DOCUMENTS

| | | |
|---|---|---|
| JP | 2015-189404 A | 11/2015 |
| JP | 2017-087906 A | 5/2017 |
| JP | 2020-052636 A | 4/2020 |
| JP | 2020-066333 A | 4/2020 |
| JP | 2020-192824 A | 12/2020 |
| WO | 2015/159341 A1 | 10/2015 |
| WO | 2017/022474 A1 | 2/2017 |

* cited by examiner

*Primary Examiner* — Rodney A Butler
(74) *Attorney, Agent, or Firm* — Sughrue Mion, PLLC

(57) ABSTRACT

A vehicle control device comprises a processor configured to set a reference lateral position, based on an intervehicular distance between the vehicle and another vehicle traveling on an adjacent lane, determine a target lateral position based on the reference lateral position and a current correction value for the reference lateral position, when the intervehicular distance falls below a predetermined reference distance, count a number of times that the lateral position of the vehicle in the traveling lane has been changed from the target lateral position, and calculate a new correction value based on a correction coefficient determined based on the number of changes and an amount of change in the lateral position of the vehicle that has changed from the target lateral position, wherein the next target lateral position is determined based on the reference lateral position and the new correction value.

5 Claims, 7 Drawing Sheets

VEHICLE CONTROL DEVICE, STORAGE MEDIUM FOR STORING COMPUTER PROGRAM FOR VEHICLE CONTROL, AND METHOD FOR CONTROLLING VEHICLE

FIELD

The present disclosure relates to a vehicle control device, a storage medium storing a computer program for vehicle control, and a method for controlling a vehicle.

BACKGROUND

An autonomous control system mounted in a vehicle generates a navigation route for the vehicle based on the current location of the vehicle, the destination location of the vehicle, and a navigation map. The autonomous control system estimates the current location of the vehicle using the map information and controls the vehicle to travel along the navigation route.

When a vehicle is traveling alongside another vehicle that is traveling on an lane adjacent to the lane in which the vehicle is traveling, the autonomous control system of the vehicle controls the lateral position of the vehicle in its traveling lane (Variable Lateral Offset (VLO) control) so that the lateral distance between the vehicle and the other vehicle is a target distance set based on the intervehicular distance, the relative speed, the width of the traveling lane, the lateral distance between the vehicle and the lane marking lines dividing the traveling lanes, and the curvature of the road on which it is traveling. The autonomous control system thereby provides the driver with a feeling of assurance that the vehicle will not approach too closely to the other vehicle (see Japanese Unexamined Patent Publication No. 2017-87906, for example).

SUMMARY

Different drivers have different levels of driver assurance for distances between their own vehicle and other vehicles traveling on adjacent lanes. Some drivers may feel anxiety if their own vehicle moves too far in the opposite direction from another vehicle in the traveling lane. In addition, some drivers may even feel that their vehicle is swaying when it moves during approach toward another vehicle traveling on an adjacent lane.

For this reason there remains room for improvement in uniform setting of the lateral positions of vehicles in traveling lanes as they approach other vehicles traveling on adjacent lanes.

It is therefore an object of the present disclosure to provide a vehicle control device that can set the lateral position of a vehicle on a traveling lane as the vehicle approaches another vehicle traveling on an adjacent lane, in a manner that is satisfactory for different drivers.

One embodiment of the invention provides a vehicle control device. The vehicle control device has a reference lateral position setting unit that sets a reference lateral position representing a reference for a lateral position perpendicular to a traveling direction of a vehicle in a traveling lane, at least based on an intervehicular distance between the vehicle and another vehicle traveling on an adjacent lane that is adjacent to the traveling lane in which the vehicle is traveling, when the intervehicular distance falls below a predetermined reference distance, a target lateral position determining unit that determines a target lateral position as the target to which the vehicle is to be controlled based on the reference lateral position and a current correction value for the reference lateral position, a counting unit that counts a number of times that the lateral position of the vehicle in a traveling lane has been changed from the target lateral position by driver operation, and a correction value calculating unit that calculates a new correction value for the reference lateral position, based on a correction coefficient determined based on the number of changes, and an amount of change in the lateral position of the vehicle that has changed from the target lateral position by driver operation, in which the target lateral position determining unit determines the next target lateral position based on the reference lateral position and the new correction value.

In this vehicle control device, relationship between the correction coefficient and number of changes preferably has a first zone in which the correction coefficient increases as the number of changes increases, a second zone in which the correction coefficient increases more than the first zone as the number of changes increases, and a third zone in which the correction coefficient increases less than the second zone as the number of changes increases.

In this vehicle control device, when an intervehicular distance between the vehicle and a second other vehicle traveling behind the vehicle in another adjacent lane different from the adjacent lane falls below a predetermined second reference distance, the correction value calculating unit preferably calculates a smaller new correction value than when there is no second other vehicle traveling in the other adjacent lane or when the intervehicular distance between the vehicle and the second other vehicle is longer than the predetermined second reference distance.

According to another embodiment, a non-transitory storage medium storing a computer program for vehicle control is provided. The computer program causes a processor execute a process and the process includes setting a reference lateral position representing a reference for a lateral position perpendicular to a traveling direction of a vehicle in a traveling lane, at least based on an intervehicular distance between the vehicle and another vehicle traveling on an adjacent lane that is adjacent to the traveling lane in which the vehicle is traveling, when the intervehicular distance falls below a predetermined reference distance, determining a target lateral position as a target to which the vehicle is to be controlled based on the reference lateral position and a current correction value for the reference lateral position, counting a number of times that the lateral position of the vehicle in the traveling lane has been changed from the target lateral position by driver operation, and calculating a new correction value for the reference lateral position, based on a correction coefficient determined based on the number of changes, and an amount of change in the lateral position of the vehicle that has changed from the target lateral position by driver operation, in which the next target lateral position is determined based on the reference lateral position and the new correction value.

Yet another embodiment of the invention provides a method for controlling a vehicle that is carried out by a vehicle control device. The method includes setting a reference lateral position representing a reference for a lateral position perpendicular to a traveling direction of a vehicle in a traveling lane, at least based on an intervehicular distance between the vehicle and another vehicle traveling on an adjacent lane that is adjacent to the traveling lane in which the vehicle is traveling, when the intervehicular distance falls below a predetermined reference distance, determining a target lateral position as a target to which the vehicle is to be controlled based on the reference lateral position and a current correction value for the reference lateral position, counting a number of times that the lateral position of the vehicle in the traveling lane has been changed from the target lateral position by driver operation, and calculating a new correction value for the reference lateral position, based on a correction coefficient determined based on the number of changes, and an amount of change in the lateral position of the vehicle that has changed from the target lateral position by driver operation, in which the next target lateral position is determined based on the reference lateral position and the new correction value.

The vehicle control device of the present disclosure can set the lateral position of a vehicle on a traveling lane as the vehicle approaches another vehicle traveling on an adjacent lane, in a manner that is satisfactory for different drivers.

The object and advantages of the invention will be realized and attained by means of the elements and combinations particularly pointed out in the claims. It is to be understood that both the foregoing general description and the following detailed description are exemplary and explanatory and are not restrictive on the invention, as claimed.

DESCRIPTION OF EMBODIMENTS

Figure 1A:
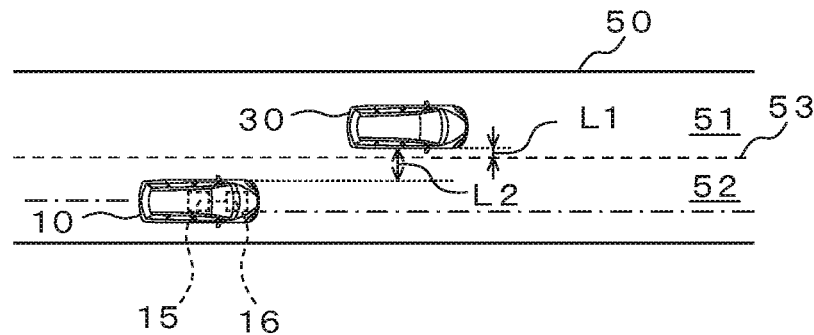
FIG. 1A is a diagram illustrating operation of the drive planning device of the embodiment in overview, showing the state of a vehicle traveling on a road.
Figure 1B:
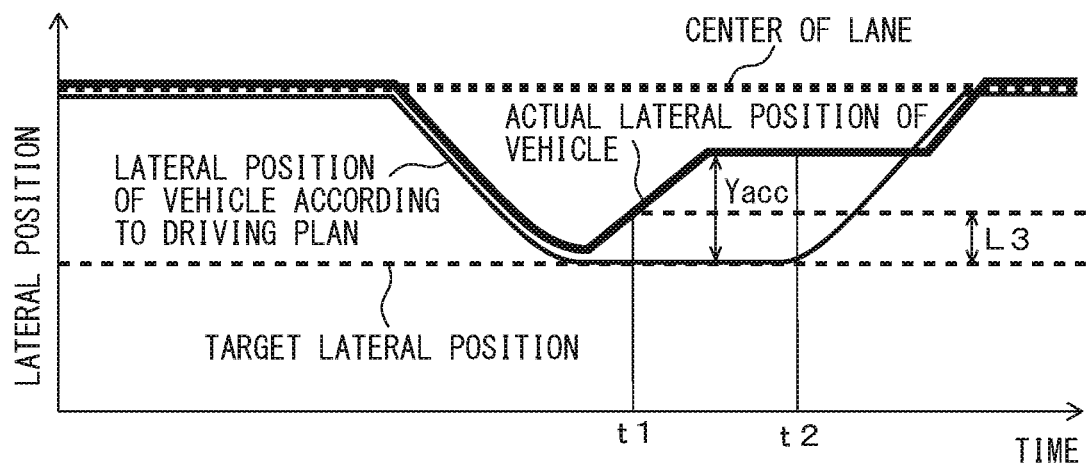
FIG. 1B is a diagram illustrating operation of the drive planning device of the embodiment in overview, showing the relationship between vehicular lateral position and time, when the lateral position of the vehicle has changed to approach an adjacent lane.
Figure 1C:
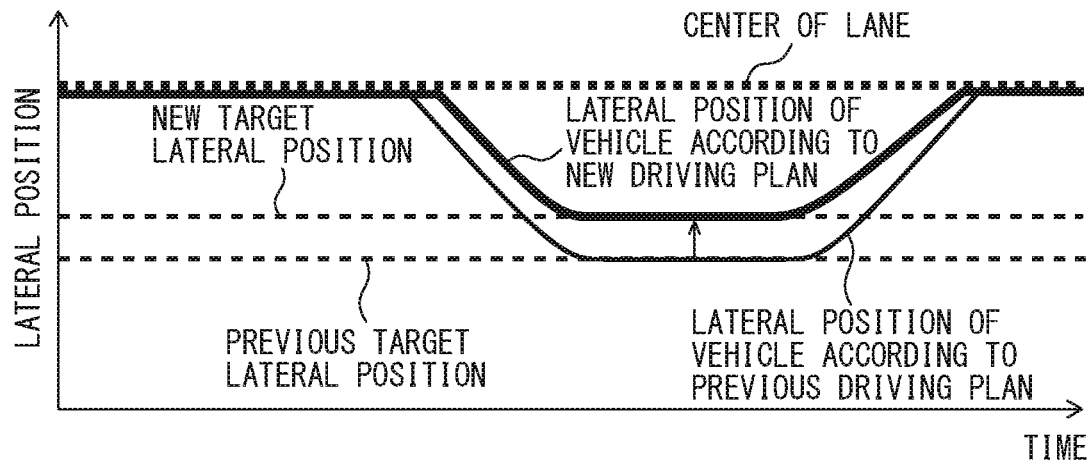
FIG. 1C is a diagram illustrating operation of the drive planning device of the embodiment in overview, and a new target lateral position.

FIG. 1A to FIG. 1C are diagrams showing operation of a drive planning device according to an embodiment in overview. FIG. 1A is a diagram showing the state of a vehicle traveling on a road. FIG. 1B is a diagram showing the relationship between vehicular lateral position and time, when the lateral position of the vehicle has changed to approach an adjacent lane side. FIG. 1C is a diagram illustrating a new target lateral position.

Operation for vehicle control processing by the drive planning device 15 as disclosed herein will now be described in overview with reference to FIG. 1A to FIG. 1C.

As shown in FIG. 1A, a vehicle 10 travels on one lane 52 of a road 50 having two lanes 51, 52. The traffic lane 51 and traffic lane 52 are divided by a lane marking line 53.

The vehicle 10 has a drive planning device 15 and a vehicle control device 16. The drive planning device 15 generates a driving plan representing a scheduled traveling trajectory for the vehicle 10 until a predetermined time ahead. The driving plan is represented as a combination of the target location of the vehicle 10 and the target vehicle speed at the target location, at each time from the current time until the predetermined time. The vehicle control device 16 controls operation of the vehicle 10 based on the driving plan. The vehicle 10 may be an autonomous vehicle.

Another vehicle 30 is traveling on the lane 51 which is adjacent to the lane 52 in which the vehicle 10 is traveling, at a location within a predetermined reference intervehicular distance ahead of the vehicle 10. The plan is for the vehicle 10 to pass the vehicle 30 after it has arrived at the side of the vehicle 30 within the predetermined reference arrival time.

The vehicle 10 will usually be traveling at the center in the widthwise direction of the lane 52. When the vehicle 30 is traveling at a location near the lane marking line 53, the distance L1 between the vehicle 30 and the lane marking line 53 is shortened. When the vehicle 10 is aligned with the vehicle 30, therefore, the distance L2 between the vehicle 10 and the vehicle 30 is shortened. A short distance L2 may cause the driver of the vehicle 10 to feel anxiety as the vehicle 30 becomes closer.

Therefore, the drive planning device 15 creates a driving plan so that the lateral position of the vehicle 10 recedes from the lane marking line 53, and travels alongside the vehicle 30 without the vehicle 10 approaching too close to the vehicle 30. Such control by the drive planning device 15 is also referred to as Variable Lateral Offset control (VLO control).

As shown in FIG. 1A, the vehicle 30 is traveling ahead in the lane 51 that is adjacent to the lane 52 in which the vehicle 10 is traveling. When the vehicle 10 arrives at the side of the vehicle 30, the drive planning device 15 judges that the distance between the vehicle 10 and the vehicle 30 is too short, if the vehicle 10 is traveling at the center of the lane 52. The drive planning device 15 sets the reference lateral position for the vehicle 10 so that the distance between the vehicle 10 and vehicle 30 is the reference lateral distance.

The drive planning device 15 determines the reference lateral position between the vehicle 10 and the other vehicle 30, based on the relative distance, relative speed, the width of the lane 52, the lateral distance between the vehicle 10 and the lane marking line 53 dividing the lane 51 and lane 52, and the curvature of the traveling road 50.

The drive planning device 15 also determines the target lateral position as the target to which the vehicle 10 is to be controlled, based on the reference lateral position and a current correction value for the reference lateral position.

The current correction value is determined so as to reflect the previous driver preference for the reference lateral position. This is because different drivers will have different levels of driver assurance for the distance between their own vehicle 10 and the other vehicle 30 traveling on the adjacent lane.

FIG. 1B shows the relationship between lateral position of the vehicle 10 and time. The ordinate represents lateral position, with a positive orientation representing a leftward orientation of the vehicle 10 (adjacent lane), and the origin representing a rightward orientation of the vehicle 10.

The drive planning device 15 creates a driving plan so that the lateral position of the vehicle 10 is at the target lateral position when the vehicle 10 has arrived at the side of the vehicle 30. In the created driving plan, the lateral position of the vehicle 10 is moved from the center of the lane 52 toward the opposite side from the adjacent lane 51, to the target lateral position. Next in the driving plan, the vehicle 10 then passes the vehicle 30, and the lateral position of the vehicle 10 is moved from the target lateral position to the center of the lane 52. The vehicle control device 16 controls operation of the vehicle 10 based on the driving plan.

As shown in FIG. 1B, the lateral position of the vehicle 10 is moved from the center of the lane 51 toward the side opposite from the adjacent lane 52. The driver therefore steers the vehicle 10 to move the vehicle 10 to the lateral position within the lane 51 where the driver feels more comfortable. In the example shown in FIG. 1B, the driver steers so that the lateral position of the vehicle 10 moves toward the center of the lane 52.

When the vehicle is being controlled based on a driving plan including the target lateral position, the drive planning device 15 counts the number of times that the lateral position of the vehicle 10 in the lane 52 has been changed from the target lateral position by driver operation.

Each time the number of changes has been counted, the drive planning device 15 calculates a new correction value for the reference lateral position, based on a correction coefficient determined based on the number of changes, and the amount of change in the lateral position of the vehicle 10 that has changed from the target lateral position by driver operation.

As shown in FIG. 1C, for subsequent VLO control, the drive planning device 15 determines a new target lateral position based on the reference lateral position and the new correction value. In the example shown in FIG. 1C, the new target lateral position is corrected to reflect previous steering by the driver, so that it is displaced further toward the center of the lane than the previous target lateral position.

As explained above, the drive planning device 15 can set the lateral position of the vehicle 10 on the traveling lane as the vehicle 10 approaches the other vehicle 30 traveling on the adjacent lane, in a manner that is satisfactory for different drivers.

Figure 2:
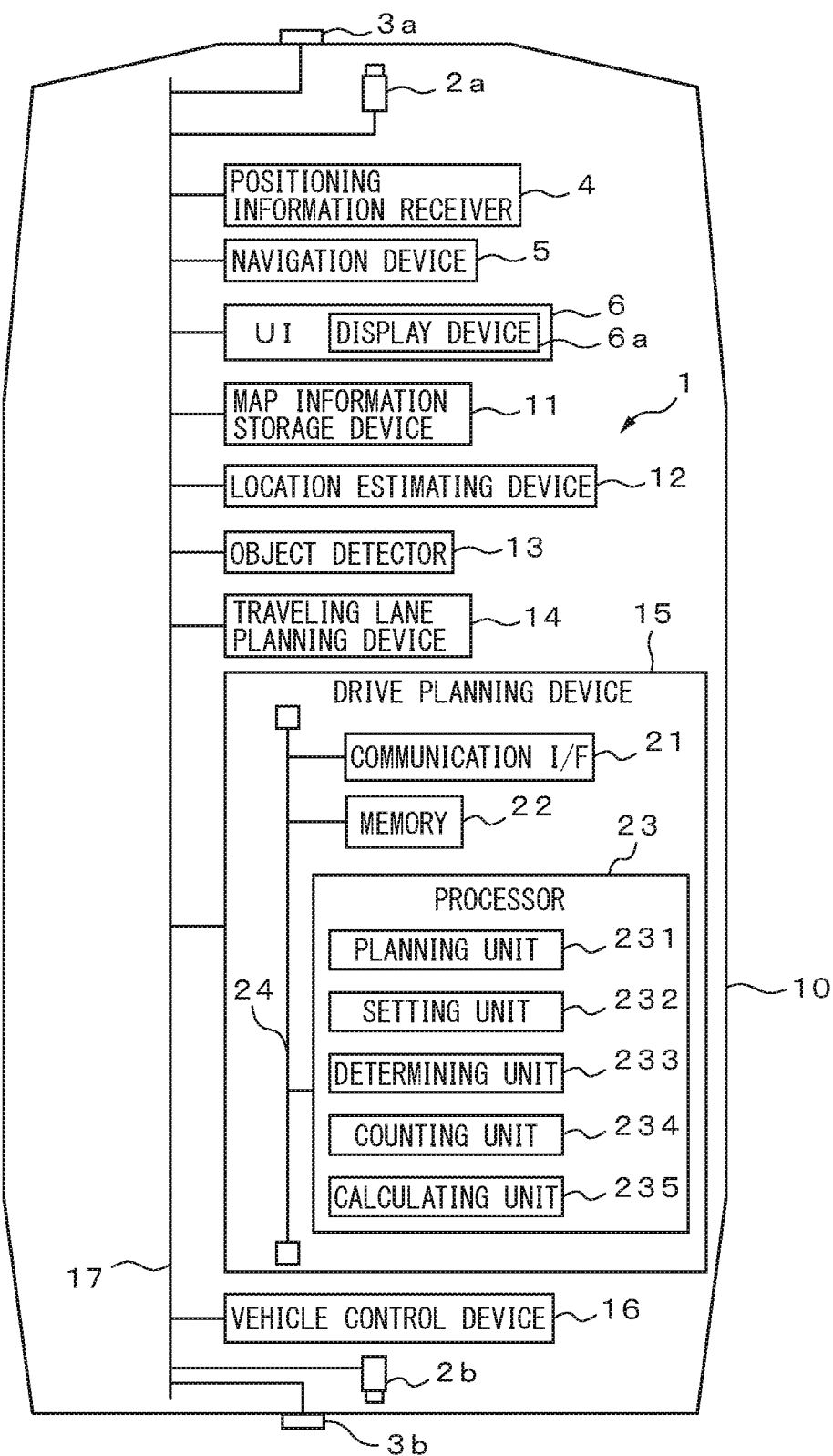
FIG. 2 is a general schematic drawing of a vehicle in which a vehicle control system of the embodiment is mounted.

FIG. 2 is a general schematic drawing of a vehicle 10 in which a vehicle control system 1 of the embodiment is mounted. The vehicle 10 has a front camera 2a, a rear camera 2b, LiDAR sensors 3a, 3b, a positioning information receiver 4, a navigation device 5, a user interface (UI) 6, a map information storage device 11, a location estimating device 12, an object detector 13, a traveling lane planning device 14, a drive planning device 15 and a vehicle control device 16, etc. The vehicle 10 may also have a millimeter wave radar, as a distance sensor (not shown) for measurement of the distance of the vehicle 10 to surrounding objects. The vehicle control system 1 has at least the drive planning device 15.

The front camera 2a and rear camera 2b, LiDAR sensors 3a, 3b, positioning information receiver 4, navigation device 5, UI 6, map information storage device 11, location estimating device 12, object detector 13, traveling lane planning device 14, drive planning device 15 and vehicle control device 16 are connected in a communicable manner through an in-vehicle network 17 that conforms to controller area network standards.

The front camera 2a and rear camera 2b are examples of imaging units provided in the vehicle 10. The front camera 2a is mounted inside the vehicle 10 and directed toward the front of the vehicle 10. The front camera 2a, for example, takes a camera image in which the environment of a predetermined region ahead of the vehicle 10 is shown, at a predetermined cycle. The rear camera 2b is mounted inside the vehicle 10 and directed toward the rear of the vehicle 10. The rear camera 2b, for example, takes a camera image in which the environment of a predetermined region behind the vehicle 10 is shown, at a predetermined cycle. The camera image can show the road in the predetermined region ahead of or behind the vehicle 10, and road features such as surface lane marking lines on the road. The front camera 2a and rear camera 2b each have a 2D detector composed of an array of photoelectric conversion elements with visible light sensitivity, such as a CCD or C-MOS, and an imaging optical system that forms an image of the photographed region on the 2D detector.

Each time a camera image is taken, the front camera 2a and rear camera 2b output a camera image and the camera image photograph time at which the camera image was taken, through the in-vehicle network 17 to the location estimating device 12 and object detector 13. The camera image is also used for processing at the location estimating device 12 to estimate the location of the vehicle 10. At the object detector 13, the camera image is used for processing to detect other objects surrounding the vehicle 10.

The LiDAR sensor 3a is mounted on the outside of the vehicle 10 and directed toward the front of the vehicle 10, while the LiDAR sensor 3b is likewise mounted and directed toward the rear of the vehicle 10. The LiDAR sensors 3a and 3b respectively synchronize and emit a scanning laser ahead and to the rear of the vehicle 10, at a reflected wave information acquisition time set with a predetermined cycle, and receive a reflected wave that has been reflected from a reflector. The time required for the reflected wave to return contains information for the distance between the vehicle 10 and other objects located in the direction in which the laser has been emitted. Each of the LiDAR sensors 3a and 3b outputs the reflected wave information that includes the laser emission direction and the time required for the reflected wave to return, together with the reflected wave information acquisition time at which the laser was emitted, through the in-vehicle network 17 to the object detector 13. At the object detector 13, the reflected wave information is used for processing to detect other objects surrounding the vehicle 10.

The positioning information receiver 4 outputs positioning information that represents the current location of the vehicle 10. The positioning information receiver 4 may be a GNSS receiver, for example. The positioning information receiver 4 outputs positioning information and the positioning information acquisition time at which the positioning information has been acquired, to the navigation device 5 and map information storage device 11, etc., each time positioning information is acquired at a predetermined receiving cycle.

Based on the navigation map information, the destination location of the vehicle 10 input through the UI 6, and positioning information representing the current location of the vehicle 10 input from the positioning information receiver 4, the navigation device 5 creates a navigation route from the current location to the destination location of the vehicle 10. The navigation route includes information relating to the locations of right turns, left turns, merging and branching. When the destination location has been newly set or the current location of the vehicle 10 has exited the navigation route, the navigation device 5 creates a new navigation route for the vehicle 10. Every time a navigation route is created, the navigation device 5 outputs the navigation route to the location estimating device 12 and the traveling lane planning device 14, etc., via the in-vehicle network 17.

The UI 6 is an example of the notification unit. The UI 6, controlled by the navigation device 5, drive planning device 15 and vehicle control device 16, etc., notifies the driver of the vehicle 10 traveling information. The traveling information of the vehicle 10 includes information relating to the current location of the vehicle and the current and future route of the vehicle, such as the navigation route. The UI 6 has a display device 5a such as a liquid crystal display or touch panel, for display of the traveling information. The UI 6 may also have an acoustic output device (not shown) to notify the driver of traveling information. The UI 6 also generates an operation signal in response to operation of the vehicle 10 by the driver. The operation information may be, for example, a destination location, transit points, vehicle speed or other control information. The UI 6 also has a touch panel or operating button, for example, as an input device for inputting operation information from the driver to the vehicle 10. The UI 6 outputs the input operation information to the navigation device 5, the drive planning device 15 and the vehicle control device 16, etc., via the in-vehicle network 17.

The map information storage device 11 stores wide-area map information for a relatively wide area (an area of 10 to 30 km$^2$, for example) that includes the current location of the vehicle 10. The map information preferably has high precision map information including three-dimensional information for the road surface, the speed limit for the road, the curvature of the road, and information for the types and locations of structures and road features such as road lane marking lines.

The map information storage device 11 receives the wide-area map information from an external server via a base station, by wireless communication through a wireless communication device (not shown) mounted in the vehicle 10, in relation to the current location of the vehicle 10, and stores it in the storage device. Each time positioning information is input from the positioning information receiver 4, the map information storage device 11 refers to the stored wide-area map information and outputs map information for a relatively narrow area including the current location represented by the positioning information (for example, an area of 100 m$^2$ to 10 km$^2$), through the in-vehicle network 17 to the location estimating device 12, object detector 13, traveling lane planning device 14, drive planning device 15 and vehicle control device 16, etc.

The location estimating device 12 estimates the location of the vehicle 10 at the camera image photograph time, based on the road features surrounding the vehicle 10 represented in the camera image taken by the front camera 2a. For example, the location estimating device 12 compares lane marking lines identified in the camera image with lane marking lines represented in the map information input from the map information storage device 11, and determines the estimated location and estimated declination of the vehicle 10 at the camera image photograph time. The location estimating device 12 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image photograph time, the location estimating device 12 outputs this information to the object detector 13, traveling lane planning device 14, drive planning device 15 and vehicle control device 16, etc.

The object detector 13 detects other objects around the vehicle 10 and their types (for example, vehicles) based on the camera image and reflected wave information. Other objects also include other vehicles traveling around the vehicle 10. The object detector 13 tracks other detected objects and determines the trajectories of the other objects. In addition, the object detector 13 identifies the traveling lanes in which the other objects are traveling, based on the lane marking lines represented in the map information and the locations of the objects. The object detector 19 also outputs object detection information which includes information representing the types of other objects that were detected, information indicating their locations, and also information indicating their traveling lanes, to the traveling lane planning device 14 and drive planning device 15, etc.

At a traveling lane-planning creation time set in a predetermined cycle, the traveling lane planning device 14 selects a traffic lane on the road on which the vehicle 10 is traveling, within the nearest driving zone (for example, 10 km) selected from the navigation route, based on the map information, the navigation route and surrounding environment information and the current location of the vehicle 10, and creates a traveling lane plan representing the scheduled traveling lane for traveling of the vehicle 10. For example, the traveling lane planning device 14 creates a traveling lane plan for the vehicle 10 to travel on a traffic lane other than a passing traffic lane. Each time a traveling lane plan is created, the traveling lane planning device 14 outputs the drive planning device 15 of the traveling lane plan.

The drive planning device 15 carries out plan processing, setting processing, assessment processing, count processing and calculation processing. The drive planning device 15 comprises a communication interface (IF) 21, a memory 22 and a processor 23 for this purpose. The communication interface 21, memory 22 and processor 23 are connected via signal wires 24. The communication interface 21 has an interface circuit to connect the drive planning device 15 with the in-vehicle network 17. The drive planning device 15 is an example of the vehicle control device.

The memory 22 is an example of a memory unit, and it has a volatile semiconductor memory and a non-volatile semiconductor memory, for example. The memory 22 stores an application computer program and various data to be used for information processing carried out by the processor 23.

All or some of the functions of the drive planning device 15 are functional modules driven by a computer program operating on the processor 23, for example. The processor 23 has a planning unit 231, a setting unit 232, a determining unit 233, a counting unit 234 and a calculating unit 235. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit.

At a driving plan creation time set with a predetermined cycle, the planning unit 231 carries out driving plan processing in which it generates a driving plan representing the scheduled traveling trajectory of the vehicle 10 up until a predetermined time (for example, 5 seconds), based on the traveling lane plan, the map information, the current location of the vehicle 10, the surrounding environment information and the vehicle status information. The surrounding environment information includes the locations and speeds of other vehicles traveling around the vehicle 10. The vehicle status information includes the current location of the vehicle 10, and the vehicle speed, acceleration and traveling direction. The driving plan is represented as a combination of the target location of the vehicle 10 and the target vehicle speed at the target location, at each time from the current time until the predetermined time. The cycle in which the driving plan is created is preferably shorter than the cycle in which the traveling lane plan is created. The drive planning device 15 generates a driving plan to maintain a spacing of at least a predetermined distance between the vehicle 10 and other objects (such as vehicles). The drive planning device 15 outputs the driving plan to the vehicle control device 16 for each driving plan generated. Other operation by the drive planning device 15 will be described in detail below.

The vehicle control device 16 controls each unit of the vehicle 10 based on the current location of the vehicle 10 and the vehicle speed and yaw rate, as well as on the driving plan generated by the drive planning device 15. For example, the vehicle control device 16 determines the steering angle, acceleration and angular acceleration of the vehicle 10 according to the driving plan and the speed and yaw rate of the vehicle 10, and sets the amount of steering, and the accelerator or brake level so as to match that steering angle, accelerator level and angular acceleration. The vehicle control device 16 also outputs a control signal corresponding to a set steering amount, to an actuator (not shown) that controls the steering wheel for the vehicle 10, via the in-vehicle network 17. The vehicle control device 16 also outputs a control signal corresponding to the set accelerator level, to a drive unit (engine or motor) of the engine of the vehicle 10, via the in-vehicle network 17. Alternatively, the vehicle control device 16 may output a control signal corresponding to a set brake level to the brake (not shown) of the vehicle 10, via the in-vehicle network 17.

The map information storage device 11, location estimating device 12, object detector 13, traveling lane planning device 14, drive planning device 15 and vehicle control device 16 are electronic control units (ECU), for example. For FIG. 2, the map information storage device 11, location estimating device 12, object detector 13, traveling lane planning device 14, drive planning device 15 and vehicle control device 16 were explained as separate devices, but all or some of them may be constructed in a single device.

Figure 3:
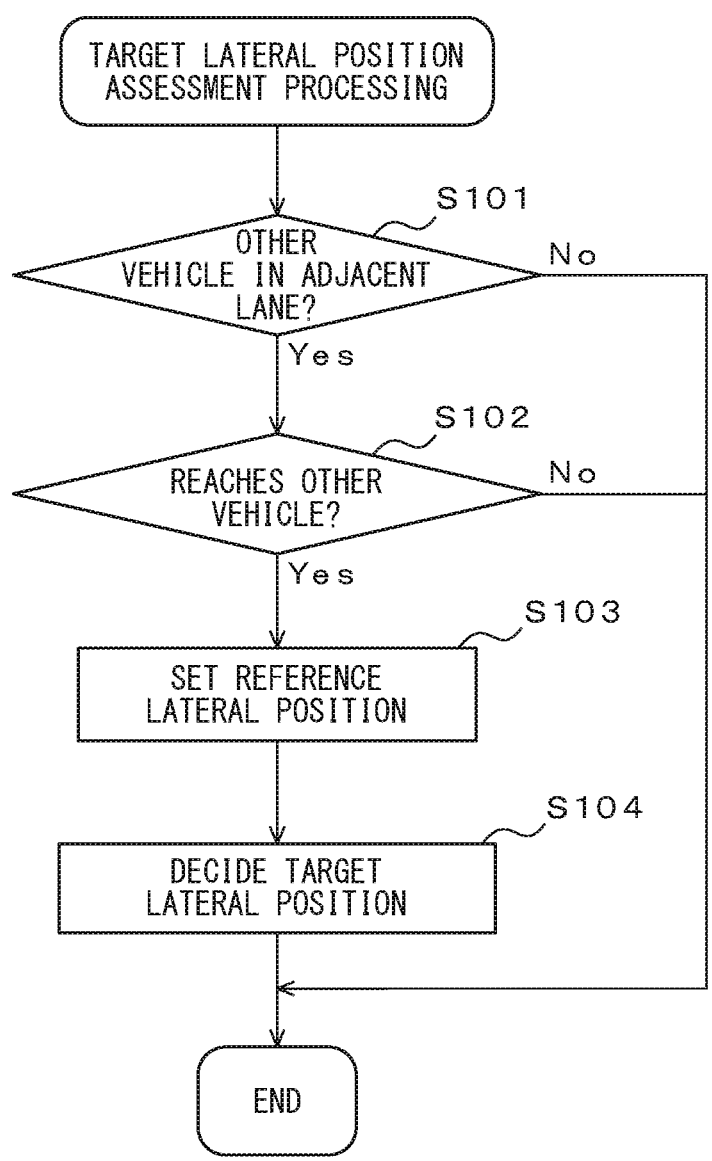
FIG. 3 is an example of an operation flow chart for target lateral position determination processing by a drive planning device of the embodiment.

FIG. 3 is an example of an operation flow chart for target lateral position assessment processing by the drive planning device 15 of the embodiment. Target lateral position assessment processing by the drive planning device 15 will be described with reference to FIG. 3. The drive planning device 15 carries out target lateral position assessment processing according to the operation flow chart shown in FIG. 3, at a target lateral position assessment time having a predetermined cycle. The cycle at which the target lateral position assessment processing is carried out is preferably no longer than the cycle for the driving plan creation time.

First, based on the current location and traveling lane of the vehicle 10 and object detection information, the setting unit 232 determines whether or not another vehicle is traveling at a location within a predetermined reference intervehicular distance in the direction ahead of the vehicle 10, on an adjacent lane that is adjacent to the traveling lane in which the vehicle 10 is traveling (step S101). When another vehicle has been detected in the direction ahead of the vehicle 10 on an adjacent lane, the setting unit 232 calculates the intervehicular distance between the vehicle 10 and the other vehicle in the longitudinal direction along the traveling direction of the vehicle 10, based on the current location of the vehicle 10 and the current location of the other vehicle traveling on the adjacent lane. When the intervehicular distance is within the reference intervehicular distance, the setting unit 232 determines that another vehicle is traveling (step S101—Yes). The reference intervehicular distance may be determined based on the speed of the vehicle 10, for example. The intervehicular distance may also be the distance on a line connecting the vehicle 10 and the other vehicle.

When another vehicle is traveling, the setting unit 232 determines whether or not the vehicle 10 will reach the other vehicle 30 within the predetermined reference arrival time (step S102). For example, the setting unit 232 calculates the relative speed between the vehicle 10 and the other vehicle in the longitudinal direction along the traveling direction of the vehicle 10, based on the speed of the vehicle 10 and the speed of the other vehicle traveling on the adjacent lane. Based on the intervehicular distance and the relative speed, the setting unit 232 calculates an estimated arrival time at which the vehicle 10 will arrive at the side of the other vehicle 30. The setting unit 232 compares the estimated arrival time with the reference arrival time, and determines whether or not the vehicle 10 will reach the other vehicle 30 within the predetermined reference arrival time. The reference arrival time may be determined based on the relative speed, for example.

When the vehicle 10 will reach the other vehicle 30 within the reference arrival time (step S102—Yes), the setting unit 232 sets a reference lateral position representing a reference for the lateral position perpendicular to the traveling direction of the vehicle 10 on the traveling lane (step S103). The reference lateral position may be set so that the distance between the vehicle 10 and vehicle 30 is the predetermined reference lateral distance. The reference lateral distance may be determined to be a distance such that the vehicle 10 does not approach too close to the other vehicle traveling on the adjacent lane, so as to provide an ordinary driver with a feeling of assurance.

The setting unit 232 determines the reference lateral position based on, for example, the intervehicular distance, the relative speed, the width of the traveling lane, the lateral distance between the vehicle and the lane marking line dividing the traveling lane and the adjacent lane, and the curvature of the traveling road. The reference lateral position may also be calculated by a publicly known method. The reference lateral position is represented on a world coordinate system where the origin is a predetermined location, for example.

The determining unit 233 then also determines the target lateral position as the target to which the vehicle 10 is to be controlled, based on the reference lateral position and a current correction value for the reference lateral position (step S104), and the series of processing steps is complete. Until the vehicle 10 reaches the other vehicle traveling on the adjacent lane, the planning unit 231 creates a driving plan so that the lateral position of the vehicle 10 is at the target lateral position.

The determining unit 233 calculates the sum of the reference lateral position Pb and the current correction value M for the reference lateral position, as the target lateral position Pa, according to the following formula (1).

$$Pa = Pb + M \qquad (1)$$

When another vehicle is not traveling (step S101—No), or when the vehicle 10 will not reach the other vehicle within the reference arrival time (step S102—No), the series of processing steps is complete.

In the above explanation, the processing to determine the target lateral position was carried out regardless of the distance between the lane marking line dividing the traveling lane and the adjacent lane, and the other vehicle traveling in the adjacent lane (L1 in FIG. 1A). The target lateral position may instead be determined only at times when the distance L1 is at or below the predetermined reference distance.

Figure 4:
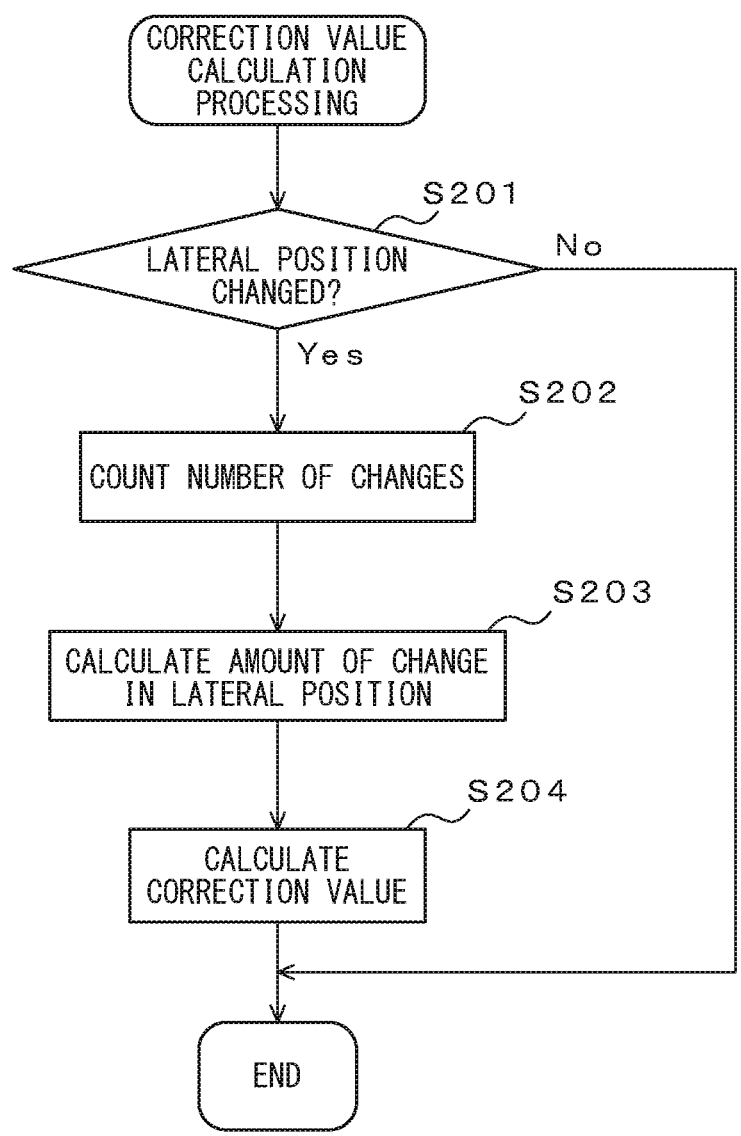
FIG. 4 is an example of an operation flow chart for correction value calculation processing by a drive planning device of the embodiment.

Correction value calculation processing will now be explained with reference to FIG. 4. FIG. 4 is an example of an operation flow chart for correction value calculation processing by a drive planning device 15 of the embodiment. The drive planning device 15 carries out correction value calculation processing according to the operation flow chart shown in FIG. 4 each time the vehicle 10 passes through a zone where the target lateral position has been determined in the target lateral position assessment processing.

First, the counting unit 234 determines whether or not the lateral position of the vehicle 10 has been changed from the target lateral position by driver operation (step S201).

If the time during which the distance between the actual lateral position of the vehicle 10 and the target lateral position is at or above the reference clearance (see FIG. 1B and FIG. 6A) was at least a predetermined reference clearance time in the zone where the target lateral position was set for the driving plan, the counting unit 234 determines that the lateral position of the vehicle 10 has changed (step S201—Yes). The reference clearance and reference clearance time can be determined in consideration of variation of the lateral position of the vehicle 10 during the time it is traveling.

When the lateral position of the vehicle 10 has been changed, the counting unit 234 counts the number of times the lateral position of the vehicle 10 has been changed from the target lateral position in the traveling lane by driver operation (step S202). The initial value for the number of changes is zero.

Next, the counting unit 234 calculates the amount of change in the lateral position of the vehicle 10 that has been changed from the target lateral position by driver operation (step S203). Using the following formula (2), the counting unit 234 calculates the amount of change S in the lateral position of the vehicle 10 in the zone where the target lateral position has been set for the driving plan. The start time t1 is the time at which the distance between the actual lateral position of the vehicle 10 and the target lateral position reached at least the reference clearance L3, and the end time t2 is the time at which the vehicle 10 passed the other vehicle (see FIG. 1B and FIG. 6A). The value $Y_{acc}$ is the distance between the actual lateral position of the vehicle 10 and the target lateral position.

$$S=\int_{t1}^{t2}Y_{acc}dt/(t2-t1) \qquad (2)$$

The calculating unit 235 then calculates a new correction value for the reference lateral position, based on the correction coefficient determined based on the number of changes, and the amount of change S in the lateral position of the vehicle 10 that has changed from the target lateral position by driver operation (step S204), and the series of processing steps is complete. The calculating unit 235 is an example of the correction value calculating unit.

When the lateral position of the vehicle 10 has not been changed (step S201—No), the series of processing steps is complete.

Processing in which the calculating unit 235 calculates a new correction value will now be explained with reference to FIG. 5. The calculating unit 235 calculates the new correction value as the product of the correction coefficient determined based on the number of changes, and the amount of change S in the lateral position of the vehicle 10 that has changed from the target lateral position by driver operation.

Figure 5:
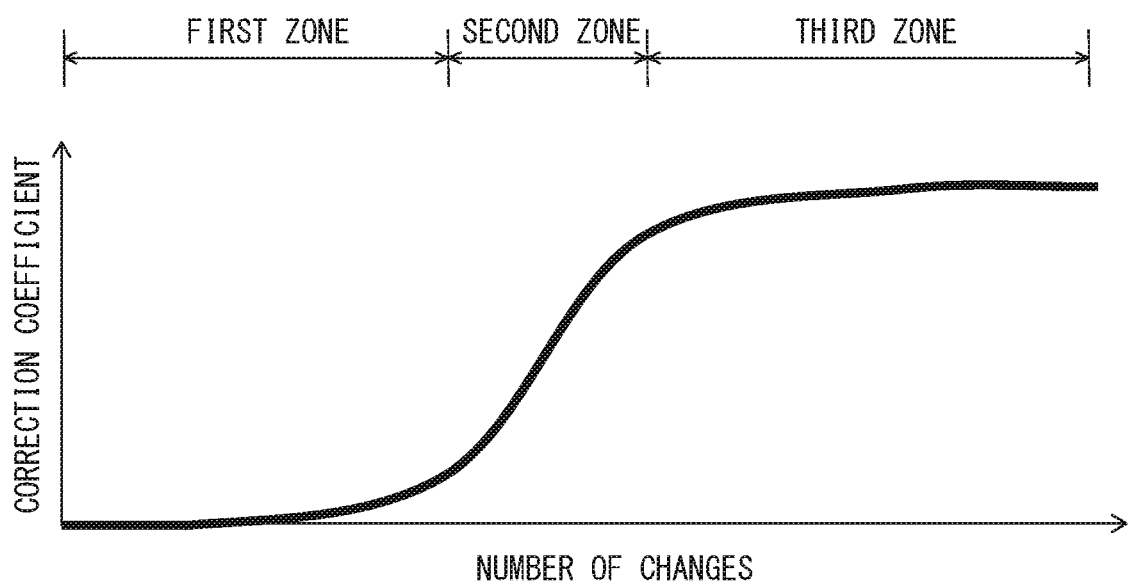
FIG. 5 is a diagram showing an example of the relationship between the correction coefficient and number of changes.

FIG. 5 is a diagram showing an example of the relationship between the correction coefficient and number of changes. The relationship between the correction coefficient and number of changes has a first zone in which the correction coefficient increases as the number of changes increases, a second zone in which the correction coefficient increases more than the first zone as the number of changes increases, and a third zone in which the correction coefficient increases less than the second zone as the number of changes increases. In some cases, changes in the lateral position by the driver at the early stage may be coincidental during the course of learning the correction values, and therefore the correction coefficient is low (first zone). When there is a tendency for the driver to change the lateral position, the correction coefficient is high (second zone). However, the correction coefficient has an upper limit in practice (third zone). The correction coefficient used may be a sigmoid function, for example. For this embodiment, the correction coefficient is positive.

The product M (the correction value) of the correction coefficient and the amount of change in the lateral position is calculated by the following formula (3). The variable "i" is the change number, "$\alpha_i$" is the correction coefficient for the "i"th change, and $S_i$ is the amount of change in lateral position for the "i"th change. The initial value $\alpha_0$ of the correction coefficient may also be zero.

$$M=\alpha_i S_i \qquad (3)$$

When the lateral position has been changed to approach to the center side of the traveling lane, the amount of change Si is positive and the correction coefficient $\alpha_i$ is zero or a positive value, and therefore the correction value M is also zero or a positive value. When the lateral position has been changed to depart from the center side of the traveling lane, the amount of change Si is negative and the correction coefficient $\alpha_i$ is zero or a positive value, and therefore the correction value M is zero or a negative value. An upper limit is preferably set for the absolute value of the correction value M. The upper limit can be determined experimentally or empirically based on the width of the lane in which the vehicle 10 is traveling.

An example of operation of the drive planning device 15 when the lateral position of the vehicle 10 has been changed to approach the adjacent lane in the zone in which the target lateral position of the vehicle 10 has been set for the driving plan, will now be explained with reference to FIG. 1B and FIG. 1C.

As shown in FIG. 1B, in the zone in which the target lateral position has been set by the driving plan, the lateral position of the vehicle 10 moves from the center of the traveling lane, away from the adjacent lane. The driver feels that the lateral position of the vehicle 10 has receded too far from the center of the traveling lane, and therefore steers the vehicle 10 closer to the center of the traveling lane.

Based on the positional relationship between the location of the vehicle 10 within the traveling lane and the other vehicle traveling on the adjacent lane, the driver steers the vehicle 10, moving the vehicle 10 to a lateral position within the traveling lane where the driver feels more comfortable.

In the example shown in FIG. 1B, the driver steers so that the lateral position of the vehicle 10 approaches the adjacent lane. After the vehicle 10 has passed the other vehicle in the adjacent lane, the lateral position of the vehicle 10 is moved toward the center of the traveling lane.

The drive planning device 15 calculates a new correction value for the reference lateral position, based on the correction coefficient determined based on the number of changes, and the amount of change in the lateral position of the vehicle 10 that has changed from the target lateral position by driver operation.

As shown in FIG. 1C, for subsequent VLO control, the drive planning device 15 determines a new target lateral position based on the reference lateral position and the new correction value. The new target lateral position is corrected to reflect previous steering by the driver, so that the location is further toward the center of the traveling lane than the previous target lateral position.

An example of operation of the drive planning device 15 when the lateral position of the vehicle 10 has been changed to recede from the adjacent lane in the zone in which the target lateral position of the vehicle 10 has been set for the driving plan, will now be explained with reference to FIG. 6A and FIG. 6B.

Figure 6A:
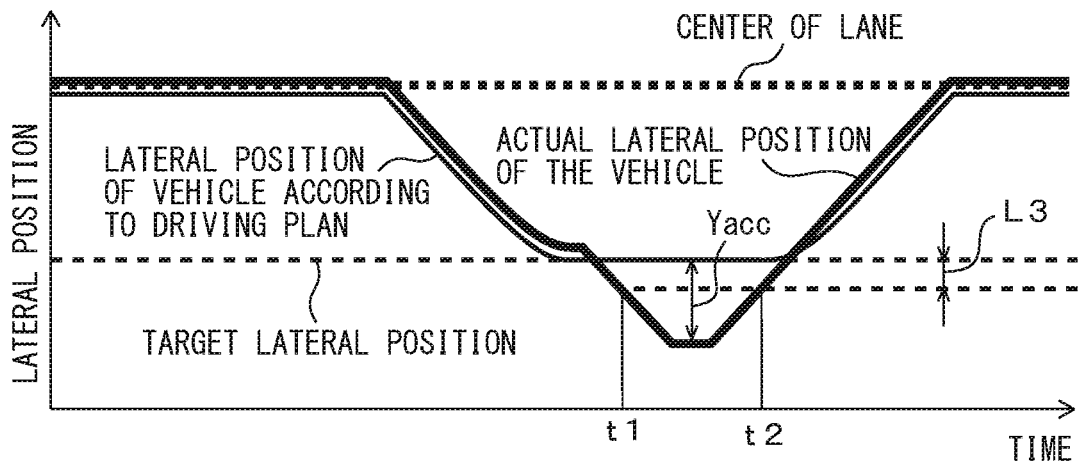
FIG. 6A is a diagram showing the relationship between vehicular lateral position and time, when the lateral position of the vehicle has changed to recede from the adjacent lane side.

As shown in FIG. 6A, in the zone in which the target lateral position has been set by the driving plan, the lateral position of the vehicle 10 moves from the center of the lane 52 to the target lateral position. The driver feels that the lateral position of the vehicle 10 is close to the other vehicle traveling on the adjacent lane, and therefore steers the vehicle 10 even further from the center of the traveling lane.

Based on the positional relationship between the location of the vehicle 10 within the traveling lane and the other vehicle traveling on the adjacent lane, the driver steers the vehicle 10, moving the vehicle 10 to a lateral position within the traveling lane where the driver feels more comfortable.

In the example shown in FIG. 6A, the driver steers so that the lateral position of the vehicle 10 recedes from the adjacent lane. After the vehicle 10 has passed the other vehicle in the adjacent lane, the lateral position of the vehicle 10 is moved toward the center of the traveling lane.

The drive planning device 15 calculates a new correction value for the reference lateral position, based on the correction coefficient determined based on the number of changes, and the amount of change in the lateral position of the vehicle 10 that has changed from the target lateral position by driver operation.

Figure 6B:
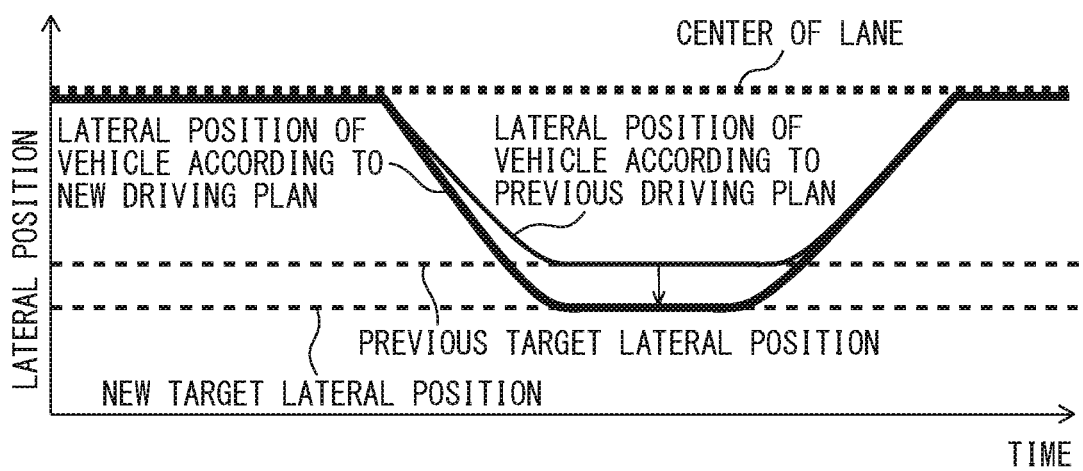
FIG. 6B is a diagram illustrating a new target lateral position.

As shown in FIG. 6B, for subsequent VLO control, the drive planning device 15 determines a new target lateral position based on the reference lateral position and the new correction value. The new target lateral position is corrected to reflect previous steering by the driver, so that the location is further away from the center of the traveling lane than the previous target lateral position.

As explained above, the drive planning device of the embodiment can set the lateral position of the vehicle in the traveling lane as it approaches another vehicle traveling on an adjacent lane, in a manner that is satisfactory for different drivers.

A modified example of the drive planning device of this embodiment will now be described with reference to FIG. 7.

Figure 7:
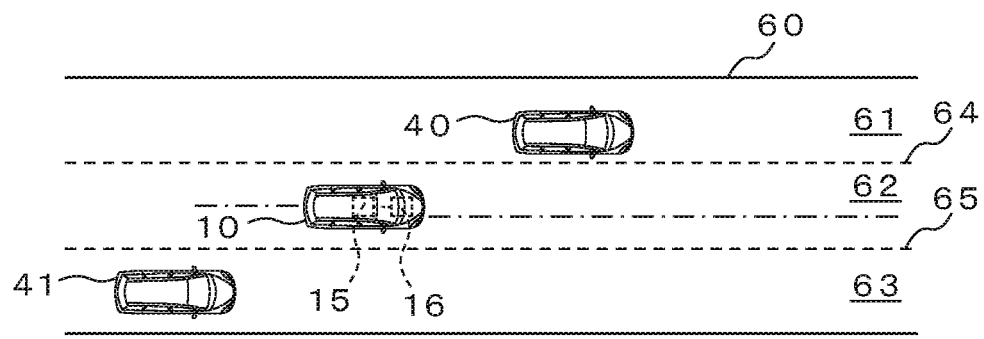
FIG. 7 is a diagram illustrating correction value calculation processing for a modified example.

FIG. 7 is a diagram illustrating correction value calculation processing for a modified example. As shown in FIG. 7, a vehicle 10 travels on one lane 62 of a road 60 having lanes 61, 62, 63. The lane 61 and lane 62 are divided by a lane marking line 64, and the lane 62 and lane 63 are divided by a lane marking line 65.

Another vehicle 40 is traveling on the lane 61 which is adjacent to the lane 62 in which the vehicle 10 is traveling, at a location within a predetermined reference intervehicular distance ahead of the vehicle 10. It is determined that the vehicle 10 passes the vehicle 40 after it has arrived at the side of the vehicle 40 within the predetermined reference arrival time. Another vehicle 41 is also traveling in the other lane 63 which is adjacent to the lane 62 in which the vehicle 10 is traveling, at a location within a second reference intervehicular distance behind the vehicle 10.

Since it has been determined that the vehicle 10 will pass the adjacent lane 61, the drive planning device 15 determines the target lateral position as the target to which the vehicle 10 is to be controlled, based on the reference lateral position and a current correction value for the reference lateral position.

The lateral position of the vehicle 10 moves from the center of the traveling lane 62 toward the target lateral position. The driver feels that the lateral position of the vehicle 10 has receded too far from the center of the traveling lane 62, and therefore steers the vehicle 10 closer to the center of the traveling lane 62.

Since the lateral position of the vehicle 10 has changed from the target lateral position in the lane 52 by driver operation, the drive planning device 15 counts the number of times that the lateral position of the vehicle 10 in the lane 62 has been changed from the target lateral position by driver operation.

The drive planning device 15 calculates a new correction value for the reference lateral position, based on the correction coefficient determined based on the number of changes, and the amount of change in the lateral position of the vehicle 10 that has changed from the target lateral position by driver operation.

The calculating unit 235 of the drive planning device 15 calculates a smaller new correction value than when there is no vehicle 41 traveling in the adjacent lane 63 or when the relative distance between the vehicle 10 and the vehicle 41 is longer than the second reference intervehicular distance. For example, the calculating unit 235 may calculate the new correction value as the product of a correction coefficient (a positive value of zero or greater and less than 1), and a correction value for when there is no vehicle 41 traveling in the adjacent lane 63 or when the relative distance between the vehicle 10 and the vehicle 41 is longer than the second reference intervehicular distance.

When passing the side of the vehicle 40 traveling ahead of the vehicle 10, the driver may change the lateral position of the vehicle 10 in consideration of the positional relationship between the vehicle 10 and the vehicle 41 traveling behind the vehicle 10. In order to prevent learning of the correction value in such special conditions, therefore, the correction value is multiplied by a correction coefficient of smaller than 1, thereby preventing over-learning.

The drive planning device 15 does not perform this correction of the correction value when there is no vehicle 41 traveling in the adjacent lane 63, or when the other vehicle 41 is not located within the second reference intervehicular distance behind the vehicle 10.

The vehicle control device, the computer program for vehicle control and the method for controlling a vehicle according to the embodiment described above may incorporate appropriate modifications that are still within the gist of the disclosure. Moreover, the technical scope of the disclosure is not limited to these embodiments, and includes the invention and its equivalents as laid out in the Claims.

For example, when the location where the vehicle is located is in bad weather with rain or snow, the correction coefficient may be zero or smaller compared to when it is in a favorable weather location with sunny weather, for example. Since the road surface is wetted in bad weather, the vehicle driving conditions will differ from a weather situation with a dry road surface. This can lower the effect that correction in bad weather may have over the correction value in good weather. The correction value may also be determined separately for good weather and for bad weather.

The invention claimed is:

1. A vehicle control system comprising:
one or more processors configured to
set a reference lateral position representing a reference for a lateral position perpendicular to a traveling direction of a vehicle in a traveling lane, at least based on an intervehicular distance between the vehicle and another vehicle traveling on an adjacent lane that is adjacent to the traveling lane in which the vehicle is traveling, when the intervehicular distance falls below a predetermined reference distance,
determine a target lateral position as a target to which the vehicle is to be controlled based on the reference lateral position and a current correction value for the reference lateral position,
count a number of times that the lateral position of the vehicle in the traveling lane has been changed from the target lateral position by driver operation,
calculate a new correction value for the reference lateral position, based on a correction coefficient determined based on the number of changes, and an amount of change in the lateral position of the vehicle that has changed from the target lateral position by driver operation,
determine a next target lateral position based on the reference lateral position and the new correction value, and
control a steering wheel of the vehicle so as to cause the vehicle to move based on the next target lateral position.

2. The vehicle control system according to claim 1, wherein relationship between the correction coefficient and number of changes has a first zone in which the correction coefficient increases as the number of changes increases, a second zone in which the correction coefficient increases more than the first zone as the number of changes increases, and a third zone in which the correction coefficient increases less than the second zone as the number of changes increases.

3. The vehicle control system according to claim 1, wherein the one or more processors is further configured to, when an intervehicular distance between the vehicle and a second other vehicle traveling behind the vehicle in another adjacent lane different from the adjacent lane falls below a predetermined second reference distance, calculate a smaller new correction value than when there is no second other vehicle traveling in the other adjacent lane or when the intervehicular distance between the vehicle and the second other vehicle is longer than the predetermined second reference distance.

4. A computer-readable, non-transitory storage medium storing a computer program for vehicle control, which causes a processor to execute a process, the process comprising:
setting a reference lateral position representing a reference for a lateral position perpendicular to a traveling direction of a vehicle in a traveling lane, at least based on an intervehicular distance between the vehicle and another vehicle traveling on an adjacent lane that is adjacent to the traveling lane in which the vehicle is traveling, when the intervehicular distance falls below a predetermined reference distance;
determining a target lateral position as a target to which the vehicle is to be controlled based on the reference lateral position and a current correction value for the reference lateral position;
counting a number of times that the lateral position of the vehicle in the traveling lane has been changed from the target lateral position by driver operation;
calculating a new correction value for the reference lateral position, based on a correction coefficient determined based on the number of changes, and an amount of change in the lateral position of the vehicle that has changed from the target lateral position by driver operation;
determining a next target lateral position based on the reference lateral position and the new correction value; and
controlling a steering wheel of the vehicle so as to cause the vehicle to move based on the next target lateral position.

5. A method for controlling a vehicle which is carried out by a vehicle control system, the method comprising:
setting a reference lateral position representing a reference for a lateral position perpendicular to a traveling direction of a vehicle in a traveling lane, at least based on an intervehicular distance between the vehicle and another vehicle traveling on an adjacent lane that is adjacent to the traveling lane in which the vehicle is traveling, when the intervehicular distance falls below a predetermined reference distance;
determining a target lateral position as a target to which the vehicle is to be controlled based on the reference lateral position and a current correction value for the reference lateral position;
counting a number of times that the lateral position of the vehicle in the traveling lane has been changed from the target lateral position by driver operation; and
calculating a new correction value for the reference lateral position, based on a correction coefficient determined based on the number of changes, and an amount of change in the lateral position of the vehicle that has changed from the target lateral position by driver operation;
determining a next target lateral position based on the reference lateral position and the new correction value; and
controlling a steering wheel of the vehicle so as to cause the vehicle to move based on the next target lateral position.

* * * * *